Patented June 18, 1946

2,402,315

UNITED STATES PATENT OFFICE 2,402,315

PREPARATION OF NITROGEN TETROXIDE ADDITION PRODUCTS

John Alexander Crowder, Palmerton, Pa., assignor to The Solvay Process Company, New York, N. Y., a corporation of New York No Drawing. Application January 4, 1944, Serial No. 516,969

12 Claims. (Cl. 260—467)

This invention relates to improvements in the preparation of addition products of oxides of nitrogen and unsaturated organic compounds.

It was known heretofore that nitrogen tetroxide will react with certain unsaturated organic compounds, particularly unsaturated hydrocarbons, containing at least one non-aromatic

linkage to form addition products. Blue-green liquid reaction products are obtained, accompanied in some cases by colorless, solid or crystalline products which are substantially homogeneous. The solid reaction products thus obtained are generally considered to be bis-nitroso compounds; e. g., bis-nitroso nitrates or bis-nitroso nitro-derivatives of the organic compound taking part in the reaction. The solid reaction products are obtained, however, in variable yields seldom exceeding 10 to 20%, and at most about 40%, of theory, based on the amount of nitrogen tetroxide consumed by the reaction. The liquid reaction products are complex mixtures of variable composition which may contain, for instance, monomeric nitroso-nitrates or nitroso-nitro derivatives, oxime nitrates, nitro oximes, dinitro compounds, nitro nitrites, and unsaturated nitro compounds formed probably by cleavage of nitrous acid from dinitro compounds. At least a substantial portion of the components of such mixtures are relatively unstable, and in most cases susceptible to oxidation by nitrogen tetroxide. As a result, secondary reactions, oxidation, and decomposition generally occur during and after reaction of the unsaturated compound with nitrogen tetroxide, thereby increasing the complexity of the mixtures. For example, secondary reactions and oxidation account, at least in part, for the erratic yields of the substantially homogeneous solid bis-nitroso compounds obtained according to some of the prior art procedures.

Individually, the components of reaction mixtures of the aforesaid type are susceptible to conversion by numerous reactions into useful derivatives by virtue of the versatile reactivity of the nitroso, nitro, nitrate, or nitrite groups included in their structure. For example, the nitrate or nitrite ester groups can be hydrolyzed to form hydroxyl groups; the nitro or nitroso groups can be reduced to amino groups; the nitro group can be eliminated with formation of a carboxyl group; and the nitroso groups can be rearranged to oxime groups. U. S. P. 2,313,719 to Beckham discloses a process wherein a mixture of nitrogen tetroxide addition products, derived for instance from an olefin mixture of higher molecular weight, is converted by reaction with an aqueous sulfite solution into a valuable water-soluble mixture of compounds containing sulfonate and sulfamate groups and having surface-active properties.

However, the instability of the addition product mixtures is of great disadvantage where their use does not permit immediate treatment with reagents adapted to effect transformation into more stable compounds. The mixtures of liquid addition products obtained are not adapted for the preparation of individual compounds since it is substantially impossible to separate their components. The substantially homogeneous solid or crystalline addition products which can be isolated from the reaction mixtures are suitable for preparation of individual compounds; but the yields of such addition products obtainable by processes heretofore employed are so erratic or so poor that commercial utilization of the addition products could not be undertaken.

I have discovered that the process for preparing an addition product of nitrogen tetroxide and an unsaturated hydrocarbon containing at least one non-aromatic

linkage, by reacting said unsaturated hydrocarbon with nitrogen tetroxide, can be surprisingly improved by carrying out the reaction in a liquid reaction medium comprising a member of the group consisting of dioxane (i. e., para-dioxane) and its methyl derivatives (e. g., dimethyl dioxane). Moreover, I have discovered that these dioxanes form complex addition products with nitrogen tetroxide, which in the case of dioxane itself can be isolated in crystalline form, and that these addition products react with unsaturated hydrocarbons containing a non-aromatic

linkage to form nitrogen tetroxide addition products, with regeneration of the dioxane.

I have found that the presence of the aforesaid dioxanes, or their nitrogen tetroxide addition products, in the reaction mixture not only inhibits to a surprising degree the tendency of the components of the mixture to undergo spontaneous oxidation, decomposition, and other secondary reactions, in such a manner as to stabilize the composition, but in addition the course of the reaction is apparently modified so that a more homogeneous reaction mixture is obtained. The dioxanes are not consumed in the reaction, but act in the nature of a catalyst, and can be employed effectively in amounts which are considerably less than the molecular equivalent of the unsaturated hydrocarbon or the nitrogen tetroxide employed.

While the reasons for the aforesaid advantages are not fully understood, the stabilizing effect of the dioxanes may result from the more moderate reactivity of the dioxane addition products as compared with free nitrogen tetroxide; and the effect on the course of the reaction may be due, at least in part, to resolution of dissimilar tautomers of the nitrogen tetroxide, upon combination with the dioxanes, into a single tautomeric form, thus inhibiting reaction of the other tautomers with the unsaturated hydrocarbon.

As a result of the improved stability of the compositions obtained according to the invention, they are suitable for use not only for a greater variety of subsequent treatments, heretofore impracticable, but can be employed as additives for commercial compositions.

An important feature of the improved process of this invention when applied to lower olefin hydrocarbons, i. e., containing 2 to 6 carbon atoms, is the formation of greatly increased yields of solid bis-nitroso derivatives, which can be readily separated from the reaction mixtures, for instance by filtration. As distinguished from the liquid mixtures of nitrogen tetroxide-addition products, the bis-nitroso compounds are substantially homogeneous, and therefore lend themselves readily to use for the preparation of other individual chemical compounds.

In the practice of the process according to the invention, an unsaturated hydrocarbon containing at least one non-aromatic

linkage is reacted with nitrogen tetroxide in a liquid reaction medium comprising one or more of the said dioxanes, preferably dioxane itself. Thus, in accordance with one method of procedure, nitrogen tetroxide is added to a liquid mixture of an olefin hydrocarbon and dioxane. In accordance with another method of procedure an olefin hydrocarbon is reacted with the complex addition product of nitrogen tetroxide and dioxane in a liquid reaction medium. That is to say, the dioxane can be added to the reaction mixture as such and/or in the form of its nitrogen tetroxide complex addition product. Thus, the dioxane can be added separately or in admixture with any of the ingredients of the reaction mixture.

The process of the invention can be applied for the preparation of the nitrogen tetroxide addition products of hydrocarbons containing at least one non-aromatic

linkage, including straight chain, branched-chain, or cyclo-aliphatic hydrocarbons, and also aromatic-aliphatic hydrocarbons containing a non-aromatic

linkage. Thus, suitable hydrocarbons include ethylene, propylene, isobutylene, pentene-2, trimethylethylene, tetramethylethylene, cyclohexene, di-isobutylene, n-octenes, cetene, and stilbene. The process is especially advantageous for the preparation of nitrogen tetroxide addition products of lower olefin hydrocarbons containing from 2 to 6 carbon atoms, particularly ethylene and propylene. Such hydrocarbons give greatly increased yields of crystalline bis-nitroso compounds upon treatment according to the process of the invention.

As indicated above, reaction of the unsaturated hydrocarbons with nitrogen tetroxide is carried out in a liquid reaction medium, preferably comprising an organic liquid which is a solvent for the dioxanes and which is relatively inert toward nitrogen tetroxide and its dioxane addition products.

When it is desired to recover from the reaction mixture a solid bis-nitroso compound, and especially one which is a derivative of an olefin hydrocarbon of 2 to 6 carbon atoms, the organic liquid employed should have very low solvent power for the bis-nitroso compound. Suitable inert organic liquids for use in the reaction mixture include, for example, petroleum ether (purified if need be by pretreatment with sulfuric acid or oleum to remove reactive constituents), carbon tetrachloride, and trichlor fluoromethane. Carbon tetrachloride and petroleum ether are preferred.

The dioxane employed in preparing the reaction mixture can be used in concentrations as low as 5% of the volume of its mixture with the organic liquid. To facilitate crystallization of the bis-nitroso compounds, the dioxane is preferably employed in concentrations not substantially exceeding 20% of the volume of the mixture of dioxane with the organic liquid, since the bis-nitroso compounds are generally soluble in dioxane, and its presence in substantially higher concentrations in the reaction mixture interferes with the crystallization. Higher concentrations of dioxane can be employed, however, followed by removal thereof after completion of the reaction, for example by vacuum distillation.

The dioxane can be mixed with the solvent and the unsaturated compound, and nitrogen tetroxide added thereto; or, alternatively, the dioxane and nitrogen tetroxide can be reacted, for example, in the presence of the solvent (such as petroleum ether), to form the complex addition product, and the resulting mixture added to the unsaturated compound with or without additional solvent. When the nitrogen tetroxide is added to a reaction mixture containing the dioxane, the amount of nitrogen tetroxide present at any time during the reaction, either in the free state or in the form of its dioxane addition product, should not exceed 0.5 mol per mol of the dioxane employed in the mixture.

The temperatures employed in the reaction should not exceed, for any considerable time, the temperature at which the dioxane-nitrogen tetroxide addition product is decomposed. Temperatures up to 25° C. are in general suitable. To avoid unnecessarily slow reaction, the temperature should be maintained above —50° C. Temperatures from —20° C. to 10° C. are preferred. The reaction may be carried out in about 1 to about 6 hours but generally it is substantially complete at the end of one hour.

The following examples, wherein parts are by weight (except as otherwise indicated) and temperatures are in degrees centigrade, illustrate the process according to the invention. Where parts by volume are referred to, the volume is equal to that of an equal number of parts by weight of water.

Example 1

16.8 parts of ethylene are reacted with 18.4 parts of nitrogen tetroxide in 200 parts of a solvent mixture containing 180 parts of carbon tetrachloride and 20 parts of dioxane, by first saturating the solvent mixture in a small tower with ethylene, then adding nitrogen tetroxide slowly while maintaining the reaction mixture at 0° to 10°. The introduction of ethylene is continued throughout the reaction to keep the solution saturated with ethylene. The reaction requires about one hour. When the reaction is complete, the reaction mixture is filtered to recover the solid addition product which separates from the mixture. The solid product may then be washed with petroleum ether. A substantial quantity of a solid crystalline addition product is thus obtained, melting at 126° to 128°, and having the characteristics of bis - ethylene - nitroso - nitrate having the following probable formula:

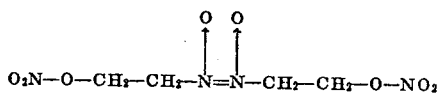

Upon carrying out the foregoing reaction in the absence of dioxane a solid crystalline addition product is also obtained, but in considerably lower yields, varying from about ⅓ to ⅔ of those obtained in the presence of dioxane.

Example 2

16.8 parts of propylene are reacted with 9.2 parts of nitrogen tetroxide in 200 parts of a liquid reaction medium consisting of 180 parts of carbon tetrachloride and 20 parts of dioxane, at a temperature of 0° to 10°, by saturating the reaction medium in a tower with propylene and then adding nitrogen tetroxide slowly. Introduction of propylene is continued, the mixture being agitated by the bubbles of propylene passing up through the liquid. The reaction is complete at the end of about one hour. The resulting reaction mixture is filtered to recover the solid addition product which separates from the mixture. This product may then be washed with petroleum ether. A high yield of a solid crystalline addition product is thus obtained, having a melting point of 131° to 132°. The product is bis-propylene-nitroso-nitrate having the following probable formula:

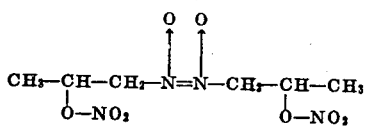

On carrying out the foregoing reaction, in the absence of dioxane, the yield of crystalline bis-propylene-nitroso-nitrate obtained is generally less than half of that obtained by the foregoing procedure.

Example 3

5 parts of propylene are reacted with 5 parts of nitrogen tetroxide as described by the preceding example, in a reaction medium consisting of 100 parts of a mixture containing 93 parts of carbon tetrachloride and 7 parts of dioxane, at 0° to 10°. The reaction is substantially complete at the end of about 1 hour. Upon working up the reaction mixture as described in the preceding example, a crystalline addition product melting with decomposition at 130° to 132° is obtained in excellent yields (of the order of 82% of theory, based on the quantity of nitrogen tetroxide consumed by the reaction).

Example 4

7.0 parts of pentene-2 are reacted with 4.6 parts of nitrogen tetroxide in 75 parts of a mixture containing 67.5 parts of carbon tetrachloride and 7.5 parts of dioxane at a temperature of 0° to 10°. When the reaction is complete, the reaction mixture is cooled to −25° and the insoluble addition product which separates from the mixture is isolated by filtration. A substantial yield of a solid crystalline addition product is thus obtained having a melting or decomposition point of 102° to 104°, and having the characteristics of a bis-nitroso-nitrate whose probable formula is as follows:

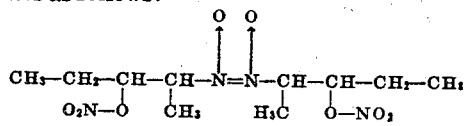

When the foregoing reaction is carried out under similar conditions, but in the absence of dioxane, a crystalline product, melting with decomposition at 96° to 98° is recovered in yields which are generally less than half of that obtained by the foregoing procedure.

When pentene-2 is treated with nitrogen tetroxide in the absence of dioxane and without a solvent, at 0° to 5°, a crystalline addition product is formed in an amount corresponding to about ⅓ of that obtained by the first procedure.

Example 5

7 parts of pentene-2 are mixed with 93 parts of a reaction medium prepared by mixing 5 parts by volume of dioxane with 95 parts by volume of petroleum ether. 4.6 parts of nitrogen tetroxide are added while maintaining the temperature of the mixture at 0° to 10°. When the reaction is complete, the mixture is cooled to −35°, and filtered to recover the solid addition product which separates. The product, which is bis-pentene-2-nitroso-nitrate, is obtained in yields of the order of 35 to 50% of theory, based on the amount of nitrogen tetroxide employed.

Example 6

11.2 parts of di-isobutylene (obtained by polymerization of an isobutylene fraction from the cracking of petroleum) are mixed with 14.9 parts of dioxane, and treated with 9.2 parts of nitrogen tetroxide at a temperature of 25°. A liquid reaction product is obtained which is considerably more stable than the corresponding product prepared under similar conditions in the absence of dioxane.

Example 7

40 parts of a mixture composed of equal volumes of dioxane and octene (prepared for example by dehydration of octanol-1 in the presence of phosphoric acid) is treated with 29.4 parts of nitrogen tetroxide at a temperature of 20°. As in the preceding example, a liquid addition product is obtained which is more stable than corresponding addition products prepared under similar conditions but in the absence of dioxane.

Example 8

Nitrogen tetroxide is passed into a solution containing equal volumes of dioxane and petroleum ether at a temperature of 10°. A crystalline dioxane-nitrogen tetroxide addition product separates from the mixture in the form of white needles. The crystalline material is stable at 25° as long as it remains wet with part of the reaction medium. Upon drying at 25° it decomposes into dioxane and nitrogen tetroxide.

A solution or suspension of the aforesaid addition product, containing the equivalent of 4.6 parts (one mol) of nitrogen tetroxide and of 4.65 parts (1.06 mol) of dioxane, in 50 parts of petroleum ether, is slowly added to a solution of 7 parts of pentene-2 in 20 parts of carbon tetrachloride (or in 38 parts of petroleum ether). The mixture is maintained at 0–10° and the reaction is allowed to go to completion over a period of about 1 hour. The reaction mixture is cooled to −25° and filtered to recover the solid addition product thereby separated. The product may be washed with petroleum ether at −30° to −20°. At room temperature this addition product is very soluble in this solvent. Crystalline bis-pentene-2-nitroso-nitrate is recovered from the mixture in substantial yields which are several times the yields obtained in the absence of dioxane.

The nitrogen tetroxidedioxane addition product can be similarly reacted with isobutylene to form bis-isobutylene nitroso nitrate in yields which are similarly superior to those obtained in the absence of dioxane.

*Example 9*

7 parts of pentene-2 and 2 parts of dimethyl dioxane (2,5-dimethyl-1,4-dioxane) are dissolved in 40 parts of petroleum ether. While maintaining the temperature of the mixture at 0°, 4.5 parts of nitrogen tetroxide are added over a period of one hour. The mixture is cooled to −20° and filtered to recover the solid bis-pentene-2-nitroso nitrate which separates from the mixture. The yield of the solid addition product is of the order of 31% of theory, based on the amount of nitrogen tetroxide employed.

Variations and modifications can be made in the foregoing examples without departing from the scope of the invention and accordingly the details of the foregoing procedures are to be interpreted as illustrative rather than in a limiting sense.

I claim:

1. In a process for preparing an addition product of nitrogen tetroxide and an unsaturated hydrocarbon containing at least one non-aromatic

linkage by reacting said unsaturated hydrocarbon with nitrogen tetroxide, the improvement which comprises carrying out the reaction in a liquid reaction medium comprising a member of the group consisting of dioxane and its methyl derivatives, the amount of nitrogen tetroxide present in the reaction mixture at any time during the reaction, in the free state and in the form of a dioxane-nitrogen tetroxide addition product, not exceeding 0.5 mol per mol of dioxane employed in the reaction mixture.

2. In a process for preparing an addition product of nitrogen tetroxide and an unsaturated hydrocarbon containing at least one non-aromatic

linkage by reacting said unsaturated hydrocarbon with nitrogen tetroxide, the improvement which comprises carrying out the reaction in a liquid reaction medium comprising at least 5% by volume of a member of the group consisting of dioxane and its methyl derivatives.

3. In a process for preparing an addition product of nitrogen tetroxide and an unsaturated hydrocarbon containing at least one non-aromatic

linkage by reacting said unsaturated hydrocarbon with nitrogen tetroxide, the improvement which comprises carrying out the reaction in a liquid reaction medium comprising at least 5% by volume of dioxane and an inert organic liquid which is a solvent for dioxane and the unsaturated hydrocarbon.

4. In a process for preparing an addition product of nitrogen tetroxide and an olefin hydrocarbon containing 2 to 6 carbon atoms by reacting said olefin hydrocarbon with nitrogen tetroxide, the improvement which comprises carrying out the reaction in a reaction medium comprising at least 5% by volume of dioxane and a member of the group consisting of carbon tetrachloride and petroleum ether.

5. A process for preparing an addition product of nitrogen tetroxide and an unsaturated hydrocarbon containing at least one non-aromatic

linkage, which consists essentially in reacting said unsaturated hydrocarbon in a liquid reaction medium with a complex addition product of nitrogen tetroxide and a member of the group consisting of dioxane and its methyl derivatives.

6. A process for preparing an addition product of nitrogen tetroxide and an unsaturated hydrocarbon containing at least one non-aromatic

linkage, which comprises admixing nitrogen tetroxide with said unsaturated hydrocarbon, in a liquid reaction medium comprising at least 5% by volume of a member of the group consisting of dioxane and its methyl derivatives at a temperature above −50° C. and not substantially exceeding 25° C.

7. A process for preparing an addition product of nitrogen tetroxide and an unsaturated hydrocarbon containing at least one non-aromatic

linkage, which comprises reacting said hydrocarbon with nitrogen tetroxide in a liquid reaction medium comprising at least 5% by volume of dioxane and an inert organic liquid which is a solvent for dioxane and said hydrocarbon, at a temperature of −20° to 10° C.

8. A process for preparing an addition product of nitrogen tetroxide and an unsaturated hydrocarbon containing at least one non-aromatic

linkage, which consists essentially in reacting said unsaturated hydrocarbon in a liquid reaction medium with a complex addition product of nitrogen tetroxide and dioxane.

9. A process for preparing a bis-nitroso compound of an olefin hydrocarbon containing from 2 to 6 carbon atoms, which comprises reacting said hydrocarbon with nitrogen tetroxide in a liquid reaction medium comprising 5% to 20% by volume of dioxane and an inert organic liquid which is a solvent for dioxane and said olefin hydrocarbon, at a temperature above −50° C. and not substantially exceeding 25° C.

10. A process for preparing a bis-nitroso compound of propylene, which comprises reacting propylene with nitrogen tetroxide in a liquid reaction medium containing 5% to 20% by volume of dioxane and an inert liquid which is a solvent for dioxane and propylene, at a temperature of —20° to 10° C.

11. A process for preparing a bis-nitroso compound of ethylene, which comprises reacting ethylene with nitrogen tetroxide in a liquid reaction medium containing 5% to 20% by volume of dioxane and an inert organic liquid which is a solvent for dioxane and ethylene, at a temperature of —20° to 10° C.

12. An addition product of nitrogen tetroxide and dioxane.

JOHN ALEXANDER CROWDER.